United States Patent
Wang et al.

(10) Patent No.: US 10,268,083 B2
(45) Date of Patent: Apr. 23, 2019

(54) CURVED SURFACE DISPLAY PANEL AND DISPLAY DEVICE

(71) Applicants: BOE TECHNOLOGY GROUP CO., LTD., Beijing (CN); HEFEI XINSHENG OPTOELECTRONICS TECHNOLOGY CO., LTD., Hefei, Anhui (CN)

(72) Inventors: Yongcan Wang, Beijing (CN); Liangliang Jiang, Beijing (CN); Lei Guo, Beijing (CN); Shuishui Zhang, Beijing (CN)

(73) Assignees: BOE TECHNOLOGY GROUP CO., LTD., Beijing (CN); HEFEI XINSHENG OPTOELECTRONICS TECHNOLOGY CO., LTD., Hefei, Anhui (CN)

( * ) Notice: Subject to any disclaimer, the term of this patent is extended or adjusted under 35 U.S.C. 154(b) by 0 days.

(21) Appl. No.: 15/534,342

(22) PCT Filed: Oct. 19, 2016

(86) PCT No.: PCT/CN2016/102609
§ 371 (c)(1),
(2) Date: Jun. 8, 2017

(87) PCT Pub. No.: WO2017/177642
PCT Pub. Date: Oct. 19, 2017

(65) Prior Publication Data
US 2018/0136504 A1    May 17, 2018

(30) Foreign Application Priority Data
Apr. 11, 2016    (CN) .......................... 2016 1 0221404

(51) Int. Cl.
*G02F 1/1339*    (2006.01)

(52) U.S. Cl.
CPC ........ *G02F 1/13394* (2013.01); *G02F 1/1339* (2013.01); *G02F 2001/13396* (2013.01)

(58) Field of Classification Search
CPC .. G02F 1/13394; G02F 1/0107; G02F 1/1339; G02F 1/13392; G02F 1/161;
(Continued)

(56) References Cited

U.S. PATENT DOCUMENTS

2009/0147207 A1* 6/2009 Goto ................... G02F 1/13394
349/155
2010/0118255 A1* 5/2010 Hashimoto ......... G02F 1/13394
349/155
(Continued)

FOREIGN PATENT DOCUMENTS

CN    101806970 A    8/2010
CN    101900910 A    12/2010
(Continued)

OTHER PUBLICATIONS

English translation of JP 2000267111 A, Title: Liquid Crystal Display Device, Author: Fujibayashi, Sadayasu; Date of publication: Sep. 29, 2000.*
(Continued)

*Primary Examiner* — Shan Liu
(74) *Attorney, Agent, or Firm* — Ladas & Parry LLP

(57) ABSTRACT

A curved surface display panel and a display device are disclosed. The curved surface display panel includes a first substrate a second substrate disposed as opposed to the first substrate, a plurality of spacer formed on the first substrate and a plurality of spacer bases formed on the second substrate in one to one correspondence to the spacers. An end of the spacer distal to the first substrate has a first inclined surface, an end of the spacer base distal to the
(Continued)

second substrate has a second inclined surface, and the first inclined surface abuts on the second inclined surface.

10 Claims, 4 Drawing Sheets

(58) Field of Classification Search
CPC ..... G02F 1/133377; G02F 2001/13396; G02F 2001/13398; G02F 1/133707; G02F 1/1333; G02F 1/133305; G02F 1/136277; G02F 2001/133302; G02F 2001/133368; G02F 2001/133354; G02F 2201/56; H01L 27/12; H01L 27/1203; H01L 27/1218; H01L 21/02367; H01L 27/3246
USPC .......................................... 349/155–157, 158
See application file for complete search history.

(56) References Cited

U.S. PATENT DOCUMENTS

| | | | | |
|---|---|---|---|---|
| 2011/0228190 | A1* | 9/2011 | Yang | G02F 1/13394 349/56 |
| 2013/0335691 | A1* | 12/2013 | Wu | G02F 1/13394 349/155 |
| 2015/0277131 | A1* | 10/2015 | Park | G02B 27/2221 349/58 |
| 2016/0091743 | A1* | 3/2016 | Yu | G02F 1/1339 349/42 |
| 2016/0109743 | A1* | 4/2016 | Wu | G02F 1/13394 349/42 |
| 2016/0170251 | A1 | 6/2016 | Xiong | |
| 2016/0377900 | A1 | 12/2016 | Qu | |
| 2017/0003538 | A1 | 1/2017 | Wang et al. | |
| 2017/0235177 | A1* | 8/2017 | Xie | G02F 1/13394 349/106 |
| 2018/0136503 | A1* | 5/2018 | Liu | G02F 1/133514 |

FOREIGN PATENT DOCUMENTS

| | | | | | |
|---|---|---|---|---|---|
| CN | 103149744 | A | * | 6/2013 | |
| CN | 104483773 | A | | 4/2015 | |
| CN | 104635384 | A | | 5/2015 | |
| CN | 104932153 | A | | 9/2015 | |
| CN | 105093709 | A | | 11/2015 | |
| CN | 105629595 | A | * | 6/2016 | ......... G02F 1/1339 |
| JP | 2000-267111 | A | | 9/2000 | |
| JP | 2000267111 | A | * | 9/2000 | |
| KR | 20080110060 | A | * | 12/2008 | |

OTHER PUBLICATIONS

English translation of KR20080110060A, Title: Liquid Crystal Display Device and Method of Manufacturing the Same, Author: Chae Gee Sung, Kim Jin Wuk; Date of publication: Dec. 8, 2008.*
English translation of CN 105629595 A, Title: Curved display panel and display device , Author: Wang Yongcan; Jiang Liangliang; Guo Lei; Zhang Shuishui; Date of publication: Jun. 1, 2016.*
English translation of CN 103149744 A, Title: Flexible display and method of manufacturing the same, Author: Li Wenyuan; Lin Xuanyou; Huang Taixiang; Date of publication: Jun. 12, 2013.*
International Search Report and Written Opinion dated Dec. 29, 2016; PCT/CN2016/102609.
The First Chinese Office Action dated Feb. 6, 2017; Appln. No. 201610221404.2.

* cited by examiner

CURVED SURFACE DISPLAY PANEL AND DISPLAY DEVICE

FIELD OF THE ART

Embodiments of the disclosure relate to the technical field of display technologies, more particularly, to a curved surface display panel and a display device.

BACKGROUND

Currently, liquid crystal display (LCD) curved display is becoming more and more popular. However, conventional LCD curved display technologies mainly use a stress to bend a display panel. Uniformity of spacing between an upper substrate and a lower substrate of the bent display panel is poor, thereby causing light leakage to the LCD.

SUMMARY

Embodiments of the disclosure provide a curved surface display panel and a display device, aiming at solving the problem of light leakage of curved surface LCD devices in conventional arts.

In first aspect of the disclosure, it is provided a curved surface display panel, comprising a first substrate, a second substrate disposed as opposed to the first substrate, a plurality of spacers formed on the first substrate and a plurality of spacer bases formed on the second substrate in one to one correspondence to the plurality of spacers; wherein an end of at least one of the plurality of spacers distal to the first substrate has a first inclined surface, an end of at least one of the plurality of spacer bases distal to the second substrate has a second inclined surface, and the first inclined surface abuts on the second inclined surface.

In second aspect of the disclosure, it is provided a display device comprising the above-mentioned curved surface display panel.

BRIEF DESCRIPTION OF THE DRAWINGS

In order to clearly illustrate the technical solution of the embodiments of the disclosure, the drawings of the embodiments will be briefly described in the following; it is obvious that the described drawings are only related to some embodiments of the disclosure and thus are not limitative of the disclosure.

DETAILED DESCRIPTION

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Unless otherwise defined, all the technical and scientific terms used herein have the same meanings as commonly understood by one of ordinary skill in the art to which the present disclosure belongs. The terms "first," "second," etc., which are used in the description and the claims of the present disclosure, are not intended to indicate any sequence, amount or importance, but distinguish various components. The terms "comprises," "comprising," "includes," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

Figure 1:
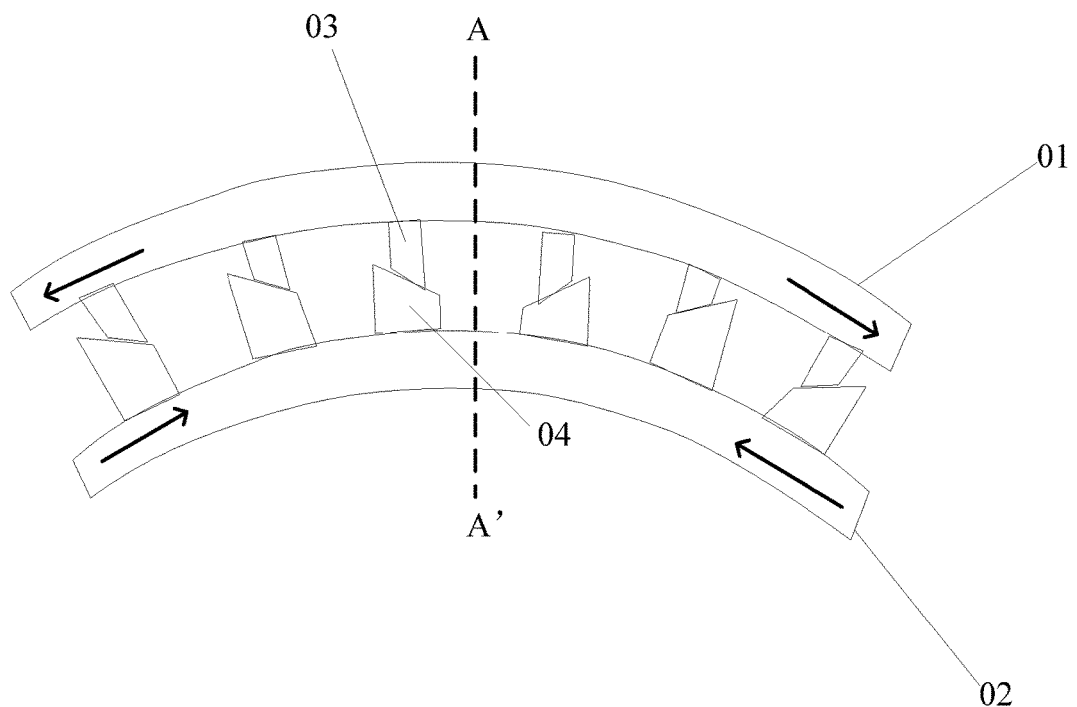
FIG. 1 schematically illustrates a curved surface display panel in accordance with an embodiment of the disclosure.

An embodiment of the disclosure provides a curved surface display panel. As illustrated in FIG. 1, the curved surface display panel comprises: a first substrate 01, a second substrate 02 disposed as opposed to the first substrate 01, a plurality of spacers 03 formed on the first substrate 01 and a plurality of spacer bases 04 formed on the second substrate 02 in one to one correspondence to the respective spacers 03. Herein an end of a spacer 03 distal to the first substrate 01 has a first inclined surface with respect to the plane of the first substrate 01, an end of a spacer base 04 distal to the second substrate 02 has a second inclined surface with respect to the plane of the second substrate 02, and the first inclined surface abuts on the second inclined surface. Inclination angles of the first inclined surface may be the same as or different from that of the second inclined surface. That is, the first inclined surface may be or may not be parallel to the second inclined surface. When the first inclined surface is parallel to the second inclined surface, the two inclined surfaces are in complete contact with each other, to form a more stable structure.

The spacers and the spacer bases are formed on the first substrate and second substrate respectively, and the abutted ends of the spacers and the spacer bases are both configured as inclined surfaces. Because the two inclined surfaces abut to each other, when the display panel is bent, the spacers and the spacer bases attach to each other to neutralize stresses, by way of the inclined surfaces, generated due to the bending of the display panel. That is, the display panel can well neutralize the generated stresses through the spacers and the spacer bases when the display panel is bent, which further guarantees uniformity of spacing between the first and second substrates, thereby effectively eliminating light leakage phenomenon of the curved surface display panel.

In at least some of embodiments, one of the first and second substrates may be an array substrate, and the other may be a color filter substrate.

In at least some of embodiments, a part of the first inclined surface and a part of the second inclined surface are in contact with each other. In other embodiments, the whole of the first inclined surface and a part of the second inclined surface are in contact with each other. Alternatively, the whole of the first inclined surface and the whole of the second inclined surface are in contact with each other.

Figure 4:
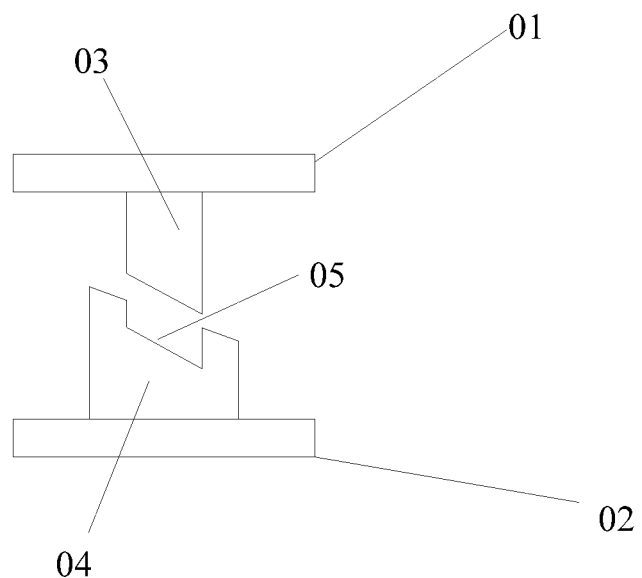
FIG. 4 schematically illustrates spacers and spacer bases in accordance with an embodiment of the disclosure.

In at least some of embodiments, as illustrated in FIG. 4, a slot 05 is formed on the second inclined surface of the spacer base 04, and a top of the spacer 03 is fixed in the slot 05, thereby realizing the engagement of the spacer 03 and the spacer base 04 via the locking mechanism between the top of spacer 03 and the slot 05. The above structure can further secure the engagement of the spacer and the spacer base, and prevent the spacer from sliding away.

Figure 5:
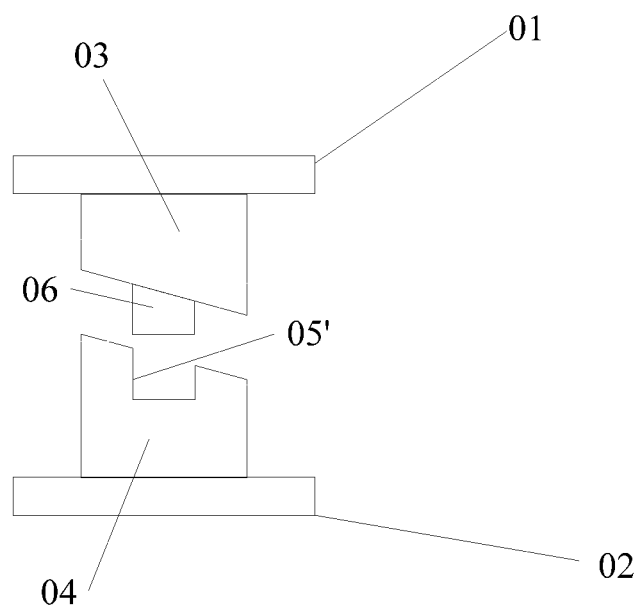
FIG. 5 schematically illustrates spacers and spacer bases in accordance with another embodiment of the disclosure.

In at least some of embodiments, as illustrated in FIG. 5, a slot 05' is formed on the second inclined surface of the spacer base 04, a protrusion 06 is formed on the first inclined surface of the spacer 03, and the protrusion 06 is fixed in the slot 05'. It thus realizes the engagement of the spacer 03 and the spacer base 04 via the locking mechanism between the protrusion 06 and the slot 05'. The above structure can also further secure the engagement of the spacer and the spacer base, and prevent the spacer from sliding away.

In at least some of embodiments, an area of the first inclined surface of the spacer is smaller than that of the second inclined surface of the spacer base, which helps to prevent the spacer from sliding away from the spacer base after the spacer and the spacer base are engaged together, and further helps stable engagement of the two.

Figure 2A:
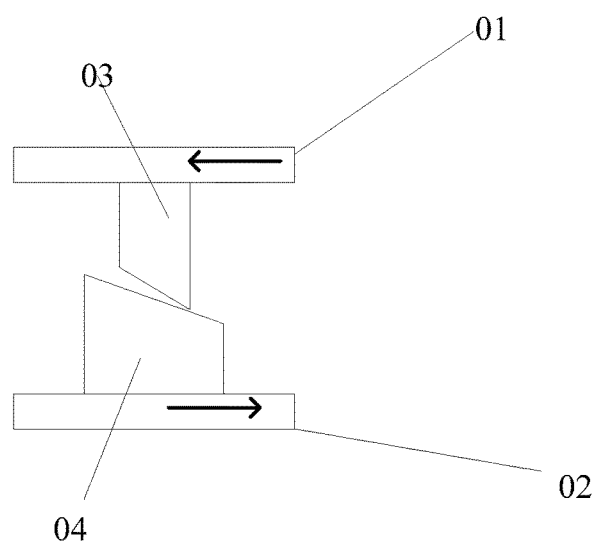
FIG. 2a and FIG. 2b respectively schematically illustrates spacers and spacer bases in the left and right regions of the curved surface display panel in FIG. 1.
Figure 2B:
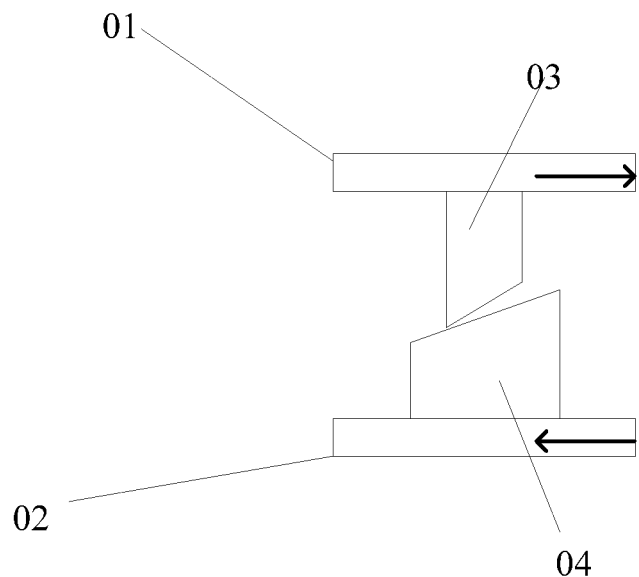

In at least some of embodiments, as illustrated in FIG. 1, the display panel bends towards a normal direction of the first substrate, i.e., vertically upwards, and a central line perpendicular to the plane of the first substrate 01 is taken as a symmetry axis A-A', the inclination direction of the inclined surface of the spacers 03 located on the left side of the symmetry axis A-A' is opposite to the inclination direction of the inclined surface of the spacers 03 located on the right side of the symmetry axis A-A'. As an example, stresses will be generated when the display panel is bent. Referring to directions as indicated by arrows in FIG. 1, when the display panel protrudes vertically upwards, the first substrate 01 experiences pull stresses towards two opposite sides of the display panel, and at the same time, the second substrate 02 experiences press stresses towards the center of the display panel. The pull stresses generated in the left and right regions of the first substrate 01 are in opposite directions, and the press stresses generated in the left and right regions of the second substrate 02 are in opposite directions. Considering of the above, the inclination direction of the inclined surfaces of spacers 03 on the first substrate 01 and located on the left side of the symmetry axis A-A' may be configured as opposite to the inclination direction of the inclined surfaces of spacers 03 located on the right side of the symmetry axis A-A'. Accordingly, inclination direction of inclined surfaces of spacer bases 04 on the second substrate 02 and located on left side of the symmetry axis A-A' may be configured as opposite to inclination direction of inclined surfaces of spacer bases 04 located on right side of the symmetry axis A-A'. As illustrated in FIGS. 2a and 2b, herein inclination directions of inclined surfaces of both the spacers 03 and spacer bases 04 on the left side of the symmetry axis A-A' are illustrated in FIG. 2a, and inclination directions of inclined surfaces of both the spacers 03 and spacer bases 04 on the right side of the symmetry axis A-A' are illustrated in FIG. 2b. It is seen that the inclination directions of inclined surfaces of the spacers 03 on the left side of the symmetry axis A-A' are opposite to those of inclined surfaces of the spacers 03 on the right side of the symmetry axis A-A', and inclination directions of inclined surfaces of the spacer bases 04 on the left side of the symmetry axis A-A' are also opposite to those of inclined surfaces of the spacer bases 04 on the right side of the symmetry axis A-A'. Therefore, the bending status of the display panel is in mirror symmetry, thus the inclined surfaces of the spacers on two opposite sides of the symmetry axis A-A' are also in mirror symmetry, and the inclined surfaces of the spacer bases on two opposite sides of the symmetry axis A-A' are also in mirror symmetry, which helps to better guarantee uniformity of spacing between the first and second substrates of the display panel.

Figure 6:
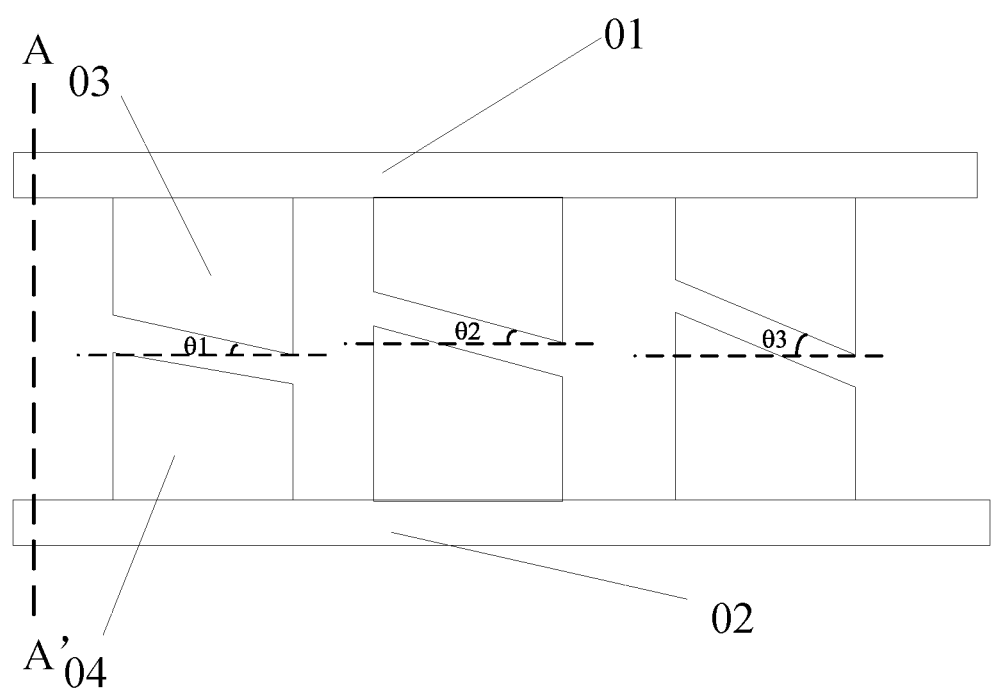
FIG. 6 schematically illustrates a curved surface display panel in the right region in accordance with still another embodiment of the disclosure.

In at least some of embodiments, inclination angles of the first inclined surfaces of the spacers on the first substrate gradually increase from the middle of the first substrate to the two opposite side edges thereof. As an example illustrated in FIG. 6, on the right side of the symmetry axis A-A', inclination angles θ of inclined surfaces of the spacers 03 gradually increase from the center of the display panel to the side edge of the display panel, that is, θ1<θ2<θ3. In the case that two opposite sides of the display panel bend towards a normal direction of the central region, a larger stress will generated in both bent side regions relative to the central region. Therefore, the inclination angles of the inclined surfaces of the spacers on the first substrate may be made gradually increasing from the middle to two opposite side edges, such that it can better mitigate the larger stress generated in both bent side regions of the display panel. Moreover, the inclination angles of the inclined surfaces of the corresponding spacer bases may be adjusted according to actual needs, such that better uniformity of spacing between the first and second substrates can be achieved.

In at least some of embodiments, the inclination angles of the inclined surfaces of the spacers located at symmetrical positions of two opposite sides of the symmetry axis respectively on the first substrate are equal to each other. As an example, the bending status of the display panel is mirror symmetry relative to the symmetry axis A-A', thus the inclined surfaces of the spacers on the first substrate are also in mirror symmetry relative to the symmetry axis A-A', and the inclined surfaces of the spacer bases are also in mirror symmetry relative to the symmetry axis A-A'. Inclination directions of inclined surfaces of the spacers or the spacer bases at symmetrical positions are opposite to each other but with equal inclination angles, which helps to better guarantee uniformity of spacing between the first and second substrates of the display panel.

Figure 3:
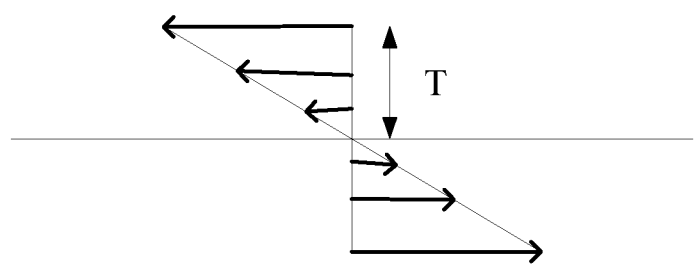
FIG. 3 schematically illustrates stresses generated in a curved surface display panel in accordance with an embodiment of the disclosure.

In at least some of embodiments, curvatures of the first and second substrates are the same, which helps to keep the uniformity of spacing between the two substrates. In the meantime, the configuration of the inclined surfaces of the spacers and the spacer bases helps to eliminate the stress generated under the bent status of the first and second substrates. Herein directions of the generated stresses after the display panel is bent are illustrated in FIG. 3 (arrows in the drawing are directions of the stresses generated by the substrates). The stress may be calculated as follows:

$$\text{stress} = \frac{E*T}{2*R},$$

herein "stress" is the stress generated by the bending of the display panel; E is the Young's coefficient, which has a constant of 73.6 GPa; T is a thickness of the corresponding substrate, which for example in a range of 0.5 mm-0.7 mm; R is a radius of curvature, which for example in a range of 4000 mm-6000 mm. The above value ranges of T and R are for illustrative purposes only and not limitative to the disclosure.

An embodiment of the disclosure further provides a display device, which comprises the above curved surface display panel. The display device may be for example applied to a mobile phone, a tablet PC, a television, a monitor, a notebook PC, a digital photoframe, a navigator, and any product or component having a display function.

The first substrate and the second substrate of the above curved surface display panel provided by the embodiments of the disclosure respectively have the spacers and spacer bases formed thereon, and ends of the spacers and spacer bases which abut each other are both inclined surfaces with opposite inclination directions. In this way, when the display panel is bent, the spacers and spacer bases abut each other, which helps to neutralize the stress generated due to the bending of the display panel by the inclined surfaces. That is, the display panel can well neutralize the generated stress by way of the spacers and spacer bases, under the bending status, which further guarantees uniformity of spacing between the first and second substrates, thereby effectively eliminating light leakage phenomenon of the curved surface display panel.

What is described above is related to the illustrative embodiments of the disclosure only and not limitative to the scope of the disclosure; the scopes of the disclosure are defined by the accompanying claims.

The present application claims priority from Chinese Application No. 201610221404.2, filed on Apr. 11, 2016, the disclosure of which is incorporated herein by reference in its entirety.

What is claimed is:

1. A curved surface display panel, comprising a first substrate, a second substrate disposed as opposed to the first substrate, a plurality of spacers formed on the first substrate and a plurality of spacer bases formed on the second substrate in one to one correspondence to the plurality of spacers;
    wherein an end of at least one of the plurality of spacers distal to the first substrate has a first inclined surface, an end of at least one of the plurality of spacer bases distal to the second substrate has a second inclined surface, and the first inclined surface abuts on the second inclined surface,
    wherein inclination angles of first inclined surfaces of the plurality of spacers on the first substrate gradually increase from a middle of the first substrate to two opposite side edges of the first substrate, and
    wherein a protrusion is protruded from the first inclined surface of the at least one of the plurality of spacers, a slot is formed at the second inclined surface of the at least one of the plurality of spacer bases, the protrusion is fixed in the slot, and an acute angle is formed between a flat surface of the protrusion facing the slot and the first inclined surface.

2. The curved surface display panel of claim 1, wherein an area of the first inclined surface is smaller than that of the second inclined surface.

3. The curved surface display panel of claim 1, wherein the display panel protrudes towards a normal direction of the first substrate, a central line perpendicular to a plane of the first substrate is taken as a symmetry axis, inclination directions of the first inclined surfaces of the plurality of spacers respectively located on two opposite sides of the symmetry axis are opposite to each other.

4. The curved surface display panel of claim 1, wherein the inclination angles of the first inclined surfaces of the plurality of spacers respectively located at symmetrical positions of two opposite sides of a symmetry axis are equal to each other.

5. The curved surface display panel of claim 1, wherein curvatures of the first substrate and the second substrate are same as each other.

6. A display device, comprising a curved surface display panel, wherein the curved surface display panel comprising a first substrate, a second substrate disposed as opposed to the first substrate, a plurality of spacers formed on the first substrate and a plurality of spacer bases formed on the second substrate in one to one correspondence to the plurality of spacers;
    wherein an end of at least one of the plurality of spacers distal to the first substrate has a first inclined surface, an end of at least one of the plurality of spacer bases distal to the second substrate has a second inclined surface, and the first inclined surface abuts on the second inclined surface,
    wherein inclination angles of first inclined surfaces of the plurality of spacers on the first substrate gradually increase from a middle of the first substrate to two opposite side edges of the first substrate, and
    wherein a protrusion is protruded from the first inclined surface of the at least one of the plurality of spacers, a slot is formed at the second inclined surface of the at least one of the plurality of spacer bases, the protrusion is fixed in the slot, and an acute angle is formed between a flat surface of the protrusion facing the slot and the first inclined surface.

7. The display device of claim 6, wherein an area of the first inclined surface is smaller than that of the second inclined surface.

8. The display device of claim 6, wherein the display panel protrudes towards a normal direction of the first substrate, a central line perpendicular to a plane of the first substrate is taken as a symmetry axis, inclination directions of the first inclined surfaces of the plurality of spacers respectively located on two opposite sides of the symmetry axis are opposite to each other.

9. The display device of claim 6, wherein the inclination angles of the first inclined surfaces of the plurality of spacers respectively located at symmetrical positions of two opposite sides of a symmetry axis are equal to each other.

10. The display device of claim 6, wherein curvatures of the first substrate and the second substrate are same as each other.

* * * * *